United States Patent [19]
Jeffrey

[11] Patent Number: 5,808,438
[45] Date of Patent: Sep. 15, 1998

[54] METHOD AND SYSTEM FOR LIMITING CURRENT IN A READ/WRITE HEAD RETRACT CIRCUIT

[75] Inventor: Edward N. Jeffrey, Garland, Tex.

[73] Assignee: Texas Instruments Incorporated, Dallas, Tex.

[21] Appl. No.: 919,867

[22] Filed: Aug. 28, 1997

Related U.S. Application Data

[60] Provisional application No. 60/028,924 Oct. 4, 1996.

[51] Int. Cl.$^6$ .................................................. G11B 21/02
[52] U.S. Cl. .......................... 318/634; 388/934; 318/434
[58] Field of Search ..................................... 318/611, 632,
318/634, 641, 471, 472, 434; 388/902,
903, 934; 360/110

[56] References Cited

U.S. PATENT DOCUMENTS 3,723,980 3/1973 Gabor .
3,753,254 8/1973 Ruble et al. .
4,870,703 9/1989 Augeri et al. .

*Primary Examiner*—Bentsu Ro
*Attorney, Agent, or Firm*—Bret J. Petersen; W. Daniel Swayze, Jr.; Richard L. Donaldson

[57] ABSTRACT

A method and system for limiting current in a read/write head retract circuit is disclosed. The system includes a temperature sensor (75) for sensing a temperature of the disk drive read/write head retract circuit (53). The temperature sensor (75) generates an output signal indicating whether the temperature is above or below a threshold temperature. The system also includes a voltage regulator (100) which applies a voltage to an actuator motor (54). The voltage regulator (100) receives an input signal operatively associated with the output signal of the temperature sensor (75), and adjusts the voltage applied to the actuator motor (54) in response to the input signal. In one embodiment, the system includes a hysteresis circuit (88) which adjusts the threshold temperature of the temperature sensor (75) when the temperature sensor output changes. The hysteresis circuit (88) prevents the system from oscillating rapidly around the threshold temperature of the temperature sensor (75), and thereby avoids unnecessary wear of the system components.

20 Claims, 2 Drawing Sheets

METHOD AND SYSTEM FOR LIMITING CURRENT IN A READ/WRITE HEAD RETRACT CIRCUIT

This application claims priority under 35 U.S.C. § 119 (e)(1) of provisional application Ser. No. 60/028,924, filed Oct. 4, 1996.

TECHNICAL FIELD OF THE INVENTION

This invention relates generally to the field of disk drive circuits and more particularly to a method and system for limiting current in a read/write head retract circuit.

BACKGROUND OF THE INVENTION

In a hard disk drive, data is generally stored in the form of a sequence of magnetically polarized regions on the surface of the disk. These sequences, known as tracks, typically appear as concentric circles on the disk. The data is read by a read/write head, which is sensitive to changes in magnetic flux. As the disk rotates under the read/write head, the read/write head "flies" on a thin cushion of air created by the motion of the disk. Thus, as the read/write head flies along a track, it detects the presence or absence of magnetic flux changes at regular intervals along the track. Typically a flux change represents a one, while the absence of a flux change indicates a zero.

To select a particular track of data to be read, the distance of the read/write head from the center of the disk must be controlled. This positioning is accomplished by an actuator motor, also known as a voice coil motor (VCM).

Under some circumstances, the read/write head should be retracted to an area of the disk on which data is not stored. This may occur when power to the hard drive is lost, when the supply voltage sags, or when the drive is "parked" by the user for any reason.

When a head retract is requested for some non-critical reason, such as a request by the user to park the hard disk drive, a slow retraction of the read/write head is desirable so as to avoid potential damage to the read/write head caused by sudden acceleration. However, when the hard disk drive supply voltage decreases below a critical level, fast retraction of the read/write heads is desirable because the read/write head is literally flying on a cushion of air above the disk surface. The read/write head will "crash" into the disk if the disk rotation rate decreases to a critical level. Therefore, when power to the spindle motor is lost or diminished, the head must be moved quickly to a safe area of the disk where it can "land."

Fast retraction of the read/write head requires a greater current to be supplied to the actuator motor than is required for a slow retraction. In prior art systems, the increased current level associated with fast retraction caused overheating of the actuator motor control circuit, particularly when the circuit became inadvertently locked into a head retraction mode. This overheating caused degradation of circuit components, and altered some of the temperature-dependent operating characteristics of the circuit.

Moreover, the fast read/write head retraction of some prior art systems caused the read/write head and/or its support structure to impact the hub or spindle of the hard disk drive, striking small fragments of material, such as aluminum, from the hub or spindle. The fragments would come to rest on the surface of the disk, creating an uneven surface which would disturb the flight of the read/write head over the disk.

SUMMARY OF THE INVENTION

Therefore, a need has arisen for a new method and system for limiting current in a read/write head retract circuit that overcomes the disadvantages and deficiencies of the prior art.

A system for limiting current in a read/write head retract circuit is disclosed. The system includes a temperature sensor for sensing a temperature of the disk drive read/write head retract circuit. The temperature sensor generates an output signal indicating whether the temperature is above or below a threshold temperature. The system also includes a voltage regulator which applies a voltage to an actuator motor. The voltage regulator receives an input signal operatively associated with the output signal of the temperature sensor, adjusts the voltage applied to the actuator motor in response to the input signal.

In one embodiment, the system includes a hysteresis circuit which adjusts the threshold temperature of the temperature sensor when the temperature sensor output changes. The hysteresis circuit prevents the system from oscillating rapidly around the threshold temperature of the temperature sensor, and thereby avoids unnecessary wear of the system components.

A method for limiting current in a read/write head retract circuit in accordance with the invention is also provided. The method comprises the steps of sensing a temperature at a temperature sensor and automatically generating an output signal indicating whether the temperature is above or below a threshold temperature; receiving at a voltage regulator an input signal operatively associated with the output signal of the temperature sensor; and automatically adjusting a voltage applied to the actuator motor in response to the input signal.

A technical advantage of the present invention is that a method and system for limiting current in a read/write head retract circuit is provided. Another technical advantage is that the system provides temperature regulation of the retract current in the actuator motor, thus preventing overheating of the circuit. Another technical advantage is that the system prevents overheating while still supplying some current to the actuator motor, thus allowing a head retract to continue. Another technical advantage is that the system adjusts itself so as not to oscillate rapidly around a threshold temperature, thereby avoiding unnecessary wear of the system components.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

Figure 1:
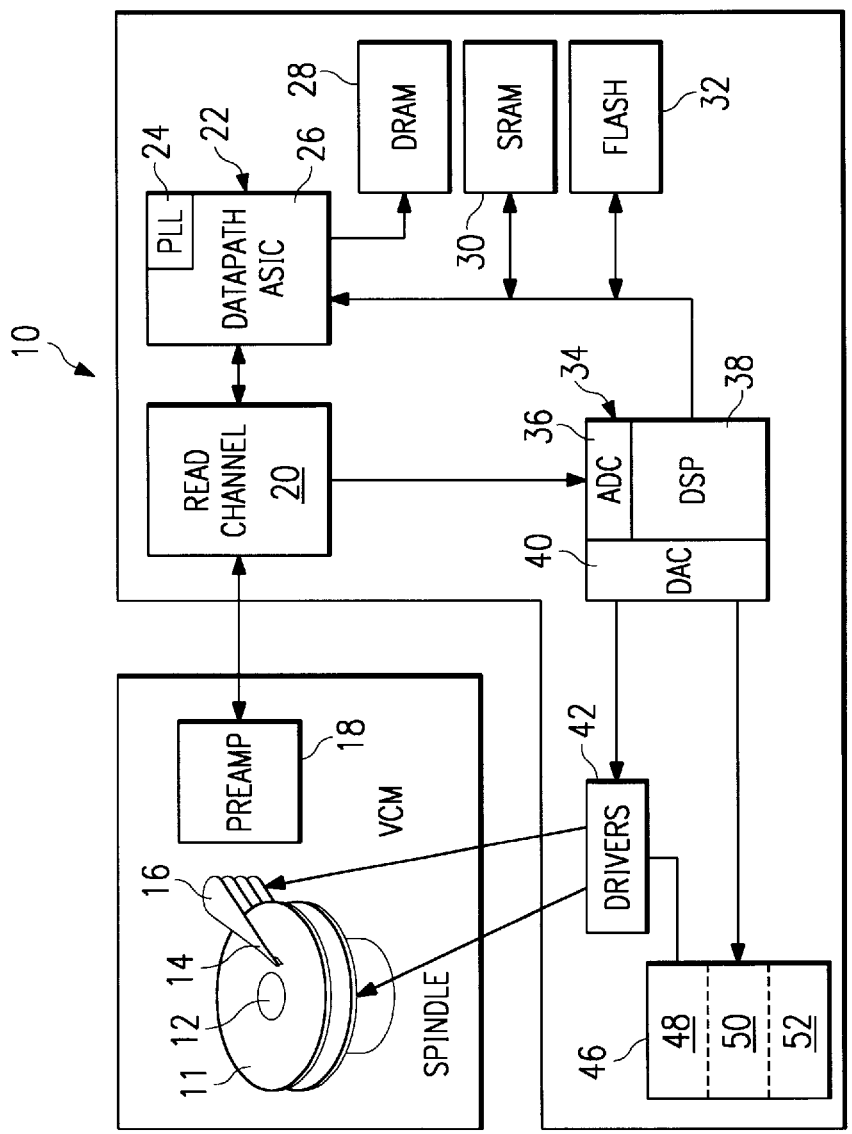
FIG. 1 is an overall block diagram of a hard disk drive system.
Figure 2:
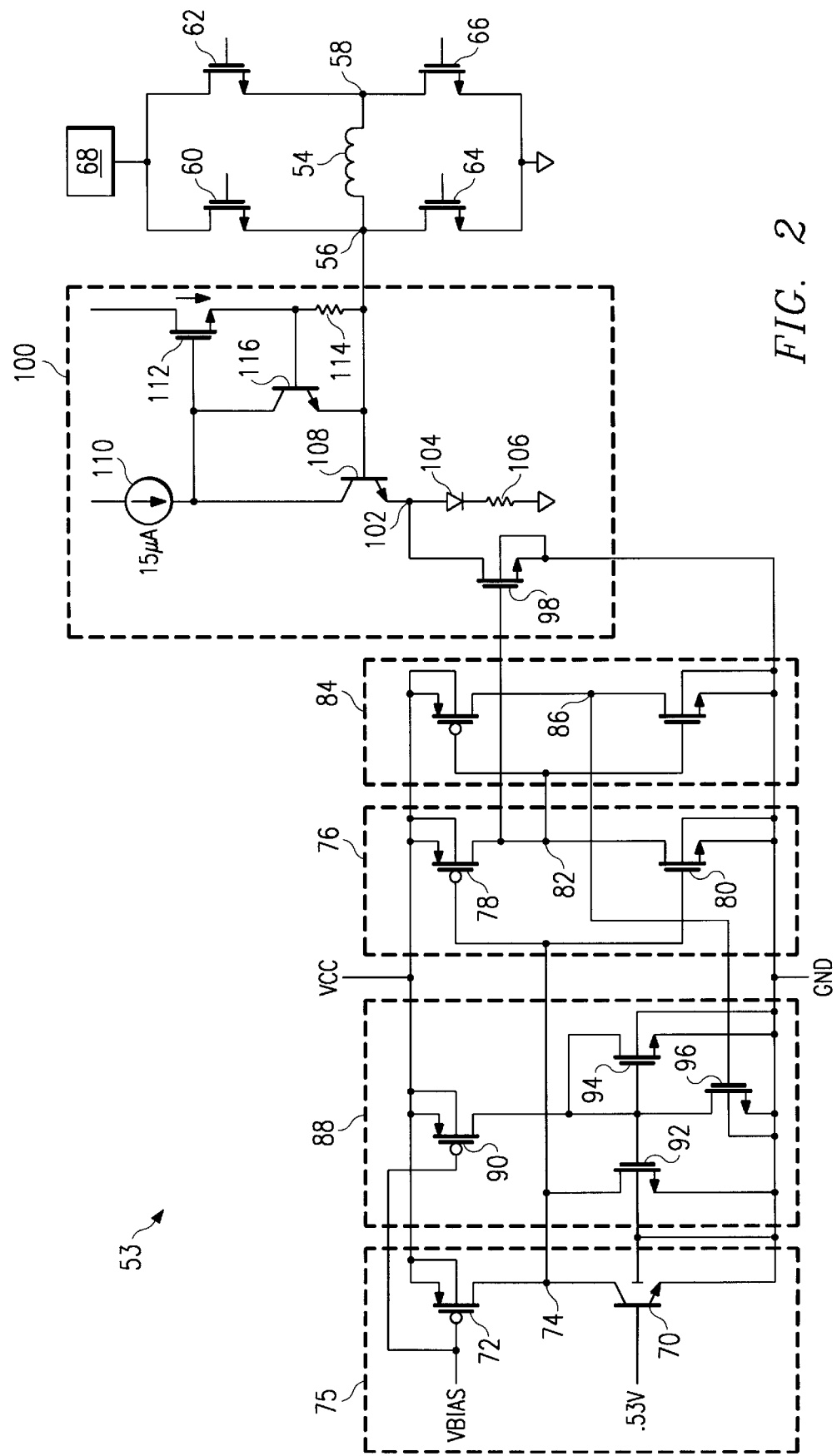
FIG. 2 is a schematic diagram of a system for limiting current in a read/write head retract circuit.

The preferred embodiment of the present invention and its advantages are best understood by referring to FIGS. 1 and 2 of the drawings, like numerals being used for like and corresponding parts of the various drawings.

Referring to FIG. 1, an overall block diagram of an exemplary hard disk drive unit 10 in accordance with the invention is shown. Hard disk drive unit 10 includes a plurality of disks 11 mounted on a rotatable spindle 12. The spindle is rotated by a spindle motor (not shown).

Each disk 11 has magnetic recording surfaces on both sides of the disk. Read/write heads 14 are mounted on actuator arms 16, which are moved in unison by an actuator motor, also known as a voice coil motor or VCM (not shown). The read/write heads 14 detect magnetic flux changes on the surfaces of the disks 11. Each flux change produces a signal which is read by a pre-amplifier 18. The pre-amplifier 18 transmits the signal to read channel 20, which decodes and otherwise processes the signal. An example of a function performed by read channel 20 is partial response, maximum likelihood detection using a Viterbi detector.

The read channel 20 sends the decoded data to block 22, which includes a phase-locked loop 24. The phase-locked loop 24 communicates with the read channel 20 to ensure that the data is read from the disk with proper synchronization. Block 22 also includes an application-specific integrated circuit (ASIC) 26, which processes the decoded data and communicates with the read channel 20, dynamic RAM unit 28, static RAM unit 30, flash memory unit 32, and digital signal processing block 38.

Read channel 20 sends the decoded data in analog form to digital signal processing block 34. This block includes an analog-to-digital converter 36, digital signal processing circuitry 38, and a digital-to-analog converter 40. Digital signal processing block 34 sends signals to spindle motor control block 48 and actuator motor control block 50 on control chip 46 indicating what actions the spindle and actuator motors should take next. Support function block 52 on control chip 46 performs support functions such as monitoring the supply voltage and retracting actuator arms 16 when the supply voltage sags below a threshold value, or when a read/write head retract is requested for some other reason.

Driver chip 42 includes power transistors controlled by signals from control chip 46. The power transistors on driver chip 42 supply power to the spindle and actuator motors in a coordinated fashion to maintain a desired rotation speed of disks 11 and to allow read/write heads 14 to read data from selected tracks on disks 11.

Referring to FIG. 2, an actuator motor control and power circuit 53 is shown. Actuator motor 54 is operable to move actuator arms 16 toward or away from the spindle 12, thus causing read/write heads 14 to travel across the respective surfaces of the disks 11. As is well known in the art, actuator motor 54 is responsive to a voltage applied across its terminals 56 and 58. For example, actuator motor 54 may move read/write heads 14 toward the spindle 12 when terminal 56 is at a greater potential than terminal 58, and away from spindle 12 when terminal 56 is at a lower potential than terminal 58. In either case, the speed with which actuator motor 54 will move read/write heads 14 varies with the magnitude of the voltage across nodes 56 and 58.

During normal read/write operation of hard disk drive unit 10, when data is to be written to and read from disks 11, the behavior of actuator motor 54 is controlled by power transistors 60 through 66 and a voltage source 68. Power transistors 60 through 66 are field-effect transistors which reside on driver chip 42.

The drains of power transistors 60 and 62 are electrically coupled to voltage source 68, while their sources are electrically coupled to nodes 56 and 58, respectively. The sources of power transistors 64 and 66 are grounded, while their drains are electrically coupled to nodes 56 and 58, respectively. Power transistors 60 through 66 are controlled by signals received at their respective gates and supplied by actuator motor control block 50. These control signals comprise four separate "high" and "low" signals which turn power transistors 60 through 66 on and off.

For example, when read/write heads 14 are to be moved toward the center of disks 11, transistors 60 and 66 are turned on, while transistors 62 and 64 are turned off. This causes node 56 to be at a high potential determined by voltage source 68, while node 58 is grounded. Likewise, when read/write heads 14 are to be moved toward the outside of disks 11, transistors 62 and 64 are turned on, while transistors 60 and 66 are turned off. When no movement of read/write heads 14 is desired, all four transistors 60 through 66 are turned off.

Although the foregoing describes the normal operation of actuator motor 54 in read/write mode, there are some circumstances in which read/write heads 14 must be retracted. These circumstances, which have been previously described, include the loss of power to hard disk drive unit 10 or a user request to "park" the drive.

When a read/write head retract is desired, power transistors 60, 62 and 64 are turned off, and power transistor 66 is turned on. Node 58 is therefore grounded. Because transistors 60 and 64 are off, node 56 is electrically isolated from voltage source 68 and ground. Node 56 is therefore free to float to any potential supplied by the remainder of circuit 53, including voltage regulator circuit 100, as will be described more fully below.

Transistor 70 is a grounded-emitter bipolar transistor with a temperature-dependent "turn-on" base-emitter voltage ($V_{BE}$), as set forth in equation (1):

$$V_{BE}(\text{turn-on}) = (kT/q) * ln(I_e/I_s) \qquad (1)$$

where k and q are constants, T is the temperature of the transistor, $I_e$ is the current conducted by the transistor, and $I_s$ is the saturation current of the transistor. In the example illustrated in FIG. 2, the turn-on $V_{BE}$ of transistor 70 has a temperature dependence of approximately −2 mV/° C.

Transistor 70 is located on control chip 46, along with all of the other elements of circuit 53 excluding elements 54 through 68. The temperature of transistor 70 therefore reflects the temperature of control chip 46. More specifically, the temperature of transistor 70 is determined by the power dissipated by voltage regulator circuit 100, as will be described more fully below.

The base of transistor 70 is maintained at a constant potential by a reference voltage source (not shown). In this example, the reference voltage is set at 0.53 volts. The reference voltage is set so that, at room temperature, the turn-on $V_{BE}$ of transistor 70 is well above the reference voltage. In this example, the room temperature turn-on voltage of transistor 70 is approximately 0.78 volts. However, when the temperature of transistor 70 increases, the turn-on $V_{BE}$ decreases. Thus, when the transistor temperature exceeds a critical value, in this example approximately 150° C., the turn-on $V_{BE}$ decreases to the reference voltage, and transistor 70 turns on.

Transistor 72 is a p-channel field-effect transistor (FET). The source of transistor 72 is connected to a voltage source $V_{CC}$, while the drain is connected to the collector of transistor 70. The gate of transistor 72 receives a constant bias potential, which causes transistor 72 to act as a constant current source. In this example, transistor 72 conducts a constant current of approximately 84 μA.

Transistor 70 is chosen so that, when its base potential exceeds its turn-on potential, it will conduct all of the current supplied by transistor 72. As a result, when transistor 70 turns on, node 74 changes from high to low potential. Thus, transistors 70 and 72 together form a temperature sensor 75 with a high/low output signal at node 74.

The output of temperature sensor 75 is supplied to the input of an inverter 76 which comprises a p-channel FET 78, an n-channel FET 80 and an output node 82. The source of FET 78 is connected to $V_{CC}$, while its drain is connected to node 82. The source of FET 80 is connected to ground, while its drain is connected to node 82. The gate of FET 78 receives the potential at node 74 inverted, and the gate of FET 80 receives the potential at node 74 non-inverted. Thus, when the potential at node 74 is high, transistor 78 turns off and transistor 80 turns on, grounding node 82. When the potential at node 74 is low, transistor 78 turns on and transistor 80 turns off, bringing node 82 up to $V_{CC}$.

The output of inverter 76 is supplied to the input of a second inverter 84, which is identical in structure to inverter 76. Thus, when node 74 is low and node 82 is high, output node 86 of inverter 76 is low, and when node 74 is high and node 82 is low, node 86 is high.

The output of second inverter 84 is supplied to a hysteresis circuit 88 comprising FETs 90 through 96. FET 90 is a p-channel FET with a source electrically connected to $V_{CC}$ and a drain electrically connected to the drains of FETs 94 and 96 and the gates of FETs 92 and 94. The drain of FET 92 is electrically connected to node 74, while the sources of FETs 92, 94 and 96 are grounded.

The gate of FET 90 receives the same constant bias potential as the gate of transistor 72, and therefore acts as a constant current source. However, the characteristics of FET 90 are chosen so that the current conducted by FET 90 is much smaller, in this case approximately 5 $\mu$A, than the current conducted by transistor 72.

FETs 92 and 94 act as a current mirror, with FET 94 as the programming transistor and FET 92 as the mirror transistor. In this example, FETs 92 and 94 are chosen so that FET 92 conducts three times the current of FET 94.

FET 96 acts as a shunt for the current supplied by FET 90. Thus, during a normal read/write head retract, when the temperature stays below the turn-on temperature of transistor 70, nodes 74 and 86 stay at high potential, and FET 96 is turned on, shunting all of the current from FET 90 to ground. The current mirror comprising FETs 92 and 94 therefore remains inactive.

However, when the temperature of transistor 70 reaches its turn-on temperature, nodes 74 and 86 become effectively grounded, and FET 96 is turned off. This causes all of the current conducted by FET 90 to be forced through programming FET 94. As a result, FET 92 conducts three times the programming current, or in this example approximately 15 $\mu$A.

Because transistors 70 and 92 are connected in parallel between node 74 and ground, the current conducted by mirror transistor 92 reduces the amount of current conducted by transistor 70. In this example, the 84 $\mu$A current conducted by FET 72 is now divided between FET 92, which conducts 15 $\mu$A, and transistor 70, which conducts the remaining 69 $\mu$A.

Referring to Equation (1), the reduction in current conducted by transistor 70 ($I_e$) results in a lowering of the turn-on $V_{BE}$, and a consequent lowering of the turn-on temperature of transistor 70 by approximately 8° C. Thus, as a result of the operation of hysteresis circuit 88, once the temperature of transistor 70 rises above its turn-on temperature, the temperature must fall approximately 8° C., to 142° C., before transistor 70 will turn off. When transistor 70 does turn off, FET 96 turns on again, deactivating the current mirror comprising FETs 92 and 94, and causing the turn-on temperature of transistor 70 to rise by approximately 8° C. to its original value of 150° C.

The output of inverter 76 is supplied to the base of a shunt transistor 98 in a voltage regulator circuit 100. The source of transistor 98 is grounded, while its drain is electrically connected to a node 102 in voltage regulator circuit 100. A diode 104 and a transistor 106 are connected in series between node 102 and ground. A bipolar transistor 108 has an emitter electrically connected to node 102, a collector electrically connected to a current source 110, and a base electrically connected to node 56. A FET 112 has a gate electrically connected to the collector of transistor 108 and a drain coupled to a voltage source (not shown). A resistor 114 is connected between the source of FET 112 and node 56. A bipolar transistor 116 has a collector electrically connected to the collector of transistor 108 and the gate of FET 112, an emitter electrically connected to node 56, and a base electrically connected to the source of FET 112.

During normal operation of voltage regulator circuit 100, FET 98 and transistor 116 are turned off. Current source 110 seeks to bring the gate of FET 112 to an equilibrium potential such that transistor 108 sinks all of the current supplied by current source 110. Because FET 98 is off, all of the current supplied by current source flows to ground through diode 104 and resistor 106. As a result, the equilibrium potential of node 102 relative to ground is approximately one diode drop (0.55 V) plus the IR voltage drop across resistor 106. In the example illustrated in FIG. 2, the equilibrium potential of node 102 is approximately 1.1 V.

Those skilled in the art will recognize that the equilibrium potential of node 56 is approximately one diode drop (0.55 V) above the equilibrium potential of node 102. This is so because, if node 56 rises to a higher level, the transistor 108 becomes more conductive, lowering the potential at the gate of FET 112, thus reducing both the current conducted by FET 112 and the potential at node 56. Likewise, if the potential falls below the equilibrium value, transistor 108 becomes less conductive, increasing the potential at the gate of FET 112. This increases both the current conducted by FET 112 and the potential at node 56. In the example illustrated in FIG. 2, the equilibrium potential of node 56 is approximately 1.64 V Transistor 116 acts as a current limiter in voltage regulator circuit 100. If the current conducted by FET 112 rises above a certain value, in this example approximately 200 mA, then the IR voltage drop across resistor 114 rises above the turn-on $V_{BE}$ of transistor 116. As a result, transistor 116 conducts current away from the gate of FET 112, reducing both the gate potential of FET 112 and the current conducted by FET 112. Because the current conducted by transistor 116 rises rapidly with $V_{BE}$ above the turn-on value, the current conducted by FET 112 is effectively capped at 200 mA.

When the temperature of transistor 70 rises sufficiently to turn on the transistor, FET 98 turns on, shunting current from the emitter of transistor 108 to ground and effectively grounding the emitter. The equilibrium potential of node 56 therefore drops to one diode drop (approximately 0.55 V) above ground, or approximately one third of its equilibrium potential with FET 98 off. Thus, when transistor 70 turns on, the potential at node 56 drops significantly, thereby decreasing the retract current supplied to actuator motor 54.

The operation of circuit 53 will now be described. When disk drive unit 10 is in a read/write mode, current source 110 and the rest of voltage regulator circuit 100 are deactivated, and actuator motor 54 is driven by power transistors 60 through 66 in a manner previously described. Although circuits 75 and 88 and inverters 76 and 84 are operational in this mode, the deactivation of voltage regulator circuit 100 renders their operation irrelevant to the functioning of actuator motor 54.

When disk drive unit 10 is in a retract mode, current source 110 and the rest of voltage regulator circuit 100 are activated by other elements (not shown) on control chip 46. In this mode, current is supplied to actuator motor 54 by FET 112 through node 56. So long as transistor 70 is not triggered by overheating of circuit 53, the amount of current supplied to actuator motor 54 is determined primarily by the resistance of resistor 106, and by the current supplied by current source 110.

In a retract mode, voltage regulator circuit 100 dissipates a significant amount of power, which causes control chip 46 to heat up. As was previously described, temperature sensor 75 senses the temperature of control chip 46, and generates an altered output signal when the temperature reaches approximately 150° C. This altered output signal causes shunt transistor 98 to turn on, thereby reducing the potential at node 56 and the current supplied to actuator motor 54 in the manner previously described. The altered output signal of temperature sensor 75 also triggers hysteresis circuit 88, which lowers the threshold temperature of temperature sensor 75 by approximately 8° C. in the manner previously described.

The reduction of the current supplied by voltage regulator circuit 100 decreases the power dissipation of the circuit, allowing control chip 46 to cool down. If the temperature of control chip 46 falls below approximately 142° C., then temperature sensor 75 alters its output signal once more, turning off shunt transistor 98 and increasing the current supplied by voltage regulator circuit 100. The altered output signal of temperature sensor 75 also triggers hysteresis circuit 88, which raises the threshold temperature of temperature sensor 75 by approximately 8° C. to its original value of approximately 150° C.

From the foregoing description, it will be recognized that circuit 53 provides thermostatic regulation of the retract current in actuator motor 54. Moreover, the action of hysteresis circuit 88 prevents the temperature of transistor 70 from oscillating rapidly around a threshold value, since the turn-on temperature of transistor 70 drops 8° C. when transistor 70 heats up and turns on, and rises 8° C. when transistor 70 cools off and turns off.

While the invention has been particularly shown and described by the foregoing detailed description, it will be understood by those skilled in the art that various other changes in form and detail may be made without departing from the spirit and scope of the invention.

What is claimed is:

1. A method for limiting current in a disk drive read/write head retract circuit comprising the steps of:

sensing a temperature at a temperature sensor;

generating an output signal at the temperature sensor, the output signal indicating whether the temperature is above a threshold temperature;

receiving at a voltage regulator an input signal operatively associated with the output signal of the temperature sensor; and adjusting a voltage applied to an actuator motor by the voltage regulator in response to the input signal of the voltage regulator.

2. The method of claim 1 wherein the generating step comprises the steps of:

generating the output signal of the temperature sensor at a first logic level when the temperature is below the threshold temperature; and generating the output signal of the temperature sensor at a second logic level when the temperature is above the threshold temperature.

3. The method of claim 2 wherein the adjusting step comprises the steps of:

decreasing the voltage applied to the actuator motor by the voltage regulator in response to the output signal of the temperature sensor being at the second logic level; and increasing the voltage applied to the actuator motor by the voltage regulator in response to the output signal of the temperature sensor being at the first logic level.

4. The method of claim 2 wherein the adjusting step comprises the steps of:

decreasing the voltage applied to the actuator motor by the voltage regulator in response to a transition in the output signal of the temperature sensor from the first logic level to the second logic level; and increasing the voltage applied to the actuator motor by the voltage regulator in response to a transition in the output signal of the temperature sensor from the second logic level to the first logic level.

5. The method of claim 2 further comprising the steps of:

receiving at a hysteresis circuit an input signal operatively associated with the output signal of the temperature sensor; and adjusting the threshold temperature of the temperature sensor by the hysteresis circuit in response to the input signal of the hysteresis circuit.

6. The method of claim 5 wherein the step of adjusting the threshold temperature of the temperature sensor comprises the steps of:

decreasing the threshold temperature of the temperature sensor in response to a transition in the output signal of the temperature sensor from the first logic level to the second logic level; and increasing the threshold temperature of the temperature sensor in response to a transition in the output signal of the temperature sensor from the second logic level to the first logic level.

7. The method of claim 1 further comprising the step of retracting a disk drive read/write head by the actuator motor in response to the voltage applied to the actuator motor by the voltage regulator.

8. A disk drive read/write head retract circuit comprising:

a temperature sensor operable to sense a temperature of the disk drive read/write head retract circuit and to generate an output signal indicating whether the temperature is above a threshold temperature; and a voltage regulator operable to receive an input signal operatively associated with the output signal of the temperature sensor, and operable to adjust a voltage applied to an actuator motor in response to the input signal.

9. The system of claim 8 further comprising a hysteresis circuit operable to receive a hysteresis input signal operatively associated with the output signal of the temperature sensor, and operable to adjust the threshold temperature of the temperature sensor in response to the hysteresis input signal.

10. The system of claim 8 wherein the temperature sensor comprises:

a transistor having a temperature-sensitive turn-on voltage, the transistor comprising a base terminal and first and second terminals, the second terminal being operable to generate the output signal of the temperature sensor;

a first constant voltage source electrically connected to the first terminal of the transistor; and a second constant voltage source electrically connected to the base terminal of the transistor.

11. The system of claim 10 wherein the temperature sensor further comprises a current source electrically connected to the second terminal of the transistor.

12. The system of claim 8 further comprising an inverter operable to receive the output signal of the temperature sensor, and operable to invert the output signal of the temperature sensor to generate the input signal of the voltage regulator.

13. The system of claim 8 wherein the voltage regulator comprises:

a current source operable to generate a current;

an impedance having first and second terminals, the first terminal being electrically connected to a first constant voltage source, the second terminal having a voltage operatively associated with the voltage applied to the actuator motor, the impedance being operable to conduct the current; and a shunt transistor having a first terminal electrically connected to the second terminal of the impedance, a second terminal electrically connected to a second constant voltage source, and a gate terminal operable to receive the input signal of the voltage regulator, the shunt transistor being operable to conduct the current in response to the input signal of the voltage regulator.

14. A disk drive comprising:

a disk having a data storage medium;

a read/write head operable to read data from the data storage medium of the disk;

an actuator motor operable to move the read/write head across a surface of the disk;

a temperature sensor operable to sense a control circuit temperature and to generate an output signal; and a voltage regulator operable to apply a voltage to the actuator motor, and operable to receive an input signal operatively associated with the output signal of the temperature sensor, and operable to adjust the voltage applied to the actuator motor in response to the input signal.

15. The system of claim 14 further comprising a hysteresis circuit operable to receive a hysteresis input signal operatively associated with the output signal of the temperature sensor, and operable to adjust the threshold temperature of the temperature sensor in response to the hysteresis input signal.

16. The system of claim 15 wherein the temperature sensor comprises:

a transistor having a temperature-sensitive turn-on voltage, the transistor comprising a base terminal and first and second terminals, the second terminal being operable to generate the output signal of the temperature sensor;

a first constant voltage source electrically connected to the first terminal of the transistor; and a second constant voltage source electrically connected to the base terminal of the transistor.

17. The system of claim 16 wherein the temperature sensor further comprises a current source electrically connected to the second terminal of the transistor and operable to generate a current.

18. The system of claim 16 wherein the hysteresis circuit comprises a current sink electrically connected to the second terminal of the transistor and operable to sink a portion of the current generated by the current source.

19. The system of claim 14 further comprising an inverter operable to receive the output signal of the temperature sensor, and operable to invert the output signal of the temperature sensor to generate the input signal of the voltage regulator.

20. The system of claim 14 wherein the voltage regulator comprises:

a current source operable to generate a current;

an impedance having first and second terminals, the first terminal being electrically connected to a first constant voltage source, the second terminal having a voltage operatively associated with the voltage applied to the actuator motor, the impedance being operable to conduct the current; and a shunt transistor having a first terminal electrically connected to the second terminal of the impedance, a second terminal electrically connected to a second constant voltage source, and a gate terminal operable to receive the input signal of the voltage regulator, the shunt transistor being operable to conduct the current in response to the input signal of the voltage regulator.

* * * * *